(12) United States Patent
Hino et al.

(10) Patent No.: US 10,333,360 B2
(45) Date of Patent: Jun. 25, 2019

(54) IRON CORE MEMBER WITH DIVIDED YOKE AND TOOTH PORTIONS WITH V-SHAPED END JOINT PORTIONS

(71) Applicant: Mitsubishi Electric Corporation, Chiyoda-ku, Tokyo (JP)

(72) Inventors: Tatsuro Hino, Tokyo (JP); Akira Hashimoto, Tokyo (JP); Masaya Inoue, Tokyo (JP); Akihiro Yamamura, Tokyo (JP); Shogo Okamoto, Tokyo (JP); Atsushi Sakaue, Tokyo (JP); Hironori Tsuiki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 822 days.

(21) Appl. No.: 14/785,209

(22) PCT Filed: Sep. 24, 2013

(86) PCT No.: PCT/JP2013/075670
§ 371 (c)(1),
(2) Date: Oct. 16, 2015

(87) PCT Pub. No.: WO2014/181482
PCT Pub. Date: Nov. 13, 2014

(65) Prior Publication Data
US 2016/0099616 A1    Apr. 7, 2016

(30) Foreign Application Priority Data

May 10, 2013    (JP) .................................. 2013-099970

(51) Int. Cl.
*H02K 1/16*    (2006.01)
*H02K 15/02*    (2006.01)

(52) U.S. Cl.
CPC ............. *H02K 1/16* (2013.01); *H02K 15/026* (2013.01); *H02K 2213/03* (2013.01)

(58) Field of Classification Search
CPC ...... H02K 1/16; H02K 1/165; H02K 2213/03; H02K 15/026
(Continued)

(56) References Cited

U.S. PATENT DOCUMENTS 6,741,005 B2 * 5/2004 Vohlgemuth ............. H02K 1/16
                                                       29/596
7,348,706 B2    3/2008 Ionel et al.
(Continued)

FOREIGN PATENT DOCUMENTS

JP    11-262201 A    9/1999
JP    2000-23397 A    1/2000
(Continued)

OTHER PUBLICATIONS

International Search Report (PCT/ISA/210) dated Dec. 24, 2013, by the Japanese Patent Office as the International Searching Authority for International Application No. PCT/JP2013/075670.

*Primary Examiner* — Bernard Rojas
*Assistant Examiner* — Maged M Almawri
(74) *Attorney, Agent, or Firm* — Buchanan Ingersoll & Rooney PC

(57) ABSTRACT

An iron core member has: first divided yoke portions; second divided yoke portions alternately arranged with the first divided yoke portions; a first tooth portion extending from one circumferential end of each first divided yoke portion, a second tooth portion extending from the other circumferential end; a third tooth portion extending from one circumferential end of the second divided yoke portion on the second tooth portion side, and a fourth tooth portion extending from the other circumferential end. A tooth end (Continued)

portion of the first tooth portion and a tooth end portion of the adjacent fourth tooth portion are integrally joined at a first tooth end joint portion, and a tooth end portion of the second tooth portion and a tooth end portion of the adjacent third tooth portion are integrally joined at a second tooth end joint portion, thereby providing one continuous sheet of the core member.

25 Claims, 23 Drawing Sheets

(58) Field of Classification Search
USPC .......... 310/216.043, 216.008, 216.009, 310/216.015–216.019, 216.041, 216.044, 310/216.069, 216.071, 216.088, 216.096, 310/216.103, 216.119; 29/596
See application file for complete search history.

(56) References Cited

U.S. PATENT DOCUMENTS

| | | | | |
|---|---|---|---|---|
| 8,102,093 | B2* | 1/2012 | Prudham | H02K 1/14 310/216.071 |
| 8,415,855 | B2* | 4/2013 | Li | H02K 1/14 310/216.069 |
| 8,786,158 | B2* | 7/2014 | Neuenschwander | H02K 1/148 310/216.043 |
| 9,647,517 | B2* | 5/2017 | Kurosaki | H02K 1/148 |
| 2007/0096587 | A1* | 5/2007 | Ionel | H02K 1/148 310/216.009 |
| 2009/0289522 | A1 | 11/2009 | Buban | |
| 2012/0126659 | A1 | 5/2012 | Jurkowski | |
| 2015/0123510 | A1* | 5/2015 | Dajaku | H02K 29/03 310/216.106 |
| 2015/0263572 | A1* | 9/2015 | Hyppias | H02K 29/03 310/83 |

FOREIGN PATENT DOCUMENTS

| | | |
|---|---|---|
| JP | 2001-339881 A | 12/2001 |
| JP | 2002-118992 A | 4/2002 |
| JP | 2005-176431 A | 6/2005 |
| JP | 2009-95132 A | 4/2009 |
| JP | 2009-539338 A | 11/2009 |
| JP | 2011-19350 | 1/2011 |
| JP | 2011-97723 A | 5/2011 |
| JP | 2011-172440 | 9/2011 |
| JP | 2010-233285 A | 10/2014 |

* cited by examiner (a)

(b)

2

(a) (b)

(a)     (b)

22

(a)  (b)

22   22

(a) (b)

(a)

703

(b)

IRON CORE MEMBER WITH DIVIDED YOKE AND TOOTH PORTIONS WITH V-SHAPED END JOINT PORTIONS

TECHNICAL FIELD

The present invention relates to an iron core member, an inner rotor type stator for rotating electrical machine, and a method for manufacturing an inner rotor type stator for rotating electrical machine.

BACKGROUND ART

In recent years, rotating electrical machines used as electric motors and electric generators are required to have a small size, high output, and a high quality. For example, in the case of a rotating electrical machine mounted on a vehicle, a space for mounting the rotating electrical machine is being reduced while output improvement is required. As a conventional rotating electrical machine, a structure is known in which divided cores are inserted from an outer circumference side into a stator coil used for a stator (for example, see Patent Document 1). Since divided cores obtained by dividing a core for every three teeth are used, the number of components is reduced as compared to the case of dividing a core for every tooth or every two teeth, thereby providing an effect of improving productivity.

Another structure is shown in which a back yoke is provided around a ring body formed by a plurality of teeth joined via deformable thin portions (for example, see Patent Document 2). In a rotating electrical machine disclosed in Patent Document 2, the deformable thin portions are deformed to insert a coil into a slot, thus providing an effect of improving a coil insertion property and reducing the number of components.

CITATION LIST

Patent Document

Patent Document 1: Japanese Laid-Open Patent Publication No. 2011-172440
Patent Document 2: Japanese Laid-Open Patent Publication No. 2011-19350

SUMMARY OF THE INVENTION

Problems to be Solved by the Invention

However, in the rotating electrical machine disclosed in Patent Document 1, in order to avoid interference with a tooth portion when a divided core is inserted into the stator coil from the outer circumference side, it is necessary to provide a dead space in a slot. Therefore, a problem arises that a space factor of the coil is reduced and output is reduced.

In the rotating electrical machine disclosed in Patent Document 2, since the coil is inserted into the core, a problem arises that, in the case of using a wire having a diameter of 2 mm or longer, rigidity of the coil becomes excessively great and workability is greatly deteriorated. Therefore, it is necessary to bundle wires having a diameter of 2 mm or shorter to make a winding, and a space factor of the coil is reduced as compared to the case of using a round wire or a rectangular wire having a large sectional area, thereby causing a problem of hindering size reduction and weight reduction in the rotating electrical machine.

When tooth portions are inserted into the coil from the outer circumference side, if each tooth portion is individually inserted, the coil is deformed by the inserted tooth portion, and regularity of the coil at a part where the tooth portions have not been inserted yet is disordered, whereby an insertion property is significantly deteriorated. Therefore, it is necessary to synchronously insert divided stacked iron cores from a radial direction. In the case of performing such synchronization, there is a problem that a complex mechanism is needed and therefore expensive facility investment is needed.

The present invention has been made to solve the above problems, and an object of the present invention is to obtain an iron core member, an inner rotor type stator for rotating electrical machine, and a method for manufacturing an inner rotor type stator for rotating electrical machine, which realize size reduction, weight reduction, a high space factor, and excellent productivity.

Solution to the Problems

An iron core member according to the present invention is an iron core member composing each stacked layer of an inner rotor type stator for rotating electrical machine including: a ring-shaped stacked iron core having stacked divided yoke portions, and stacked tooth portions extending from the stacked divided yoke portions and having an identical shape; and a coil provided in slot portions of the stacked iron core. The iron core member includes: a plurality of first divided yoke portions; a plurality of second divided yoke portions arranged alternately with the first divided yoke portions; a first tooth portion extending from one circumferential end of each first divided yoke portion, and a second tooth portion extending from the other circumferential end thereof; and a third tooth portion extending from one circumferential end, of each second divided yoke portion, which is on a second tooth portion side, and a fourth tooth portion extending from the other circumferential end thereof. A first recess forming a corresponding one of the slot portions is formed between the first tooth portion and the second tooth portion extending from each first divided yoke portion. A second recess forming a corresponding one of the slot portions is formed between the third tooth portion and the fourth tooth portion extending from each second divided yoke portion. The first tooth portion, and the fourth tooth portion adjacent thereto are used for composing a corresponding one of the stacked tooth portions. The second tooth portion, and the third tooth portion adjacent thereto are used for composing a corresponding one of the stacked tooth portions. A tooth end portion of the first tooth portion and a tooth end portion of the fourth tooth portion adjacent thereto are integrally joined in a V shape at a first tooth end joint portion, and a tooth end portion of the second tooth portion and a tooth end portion of the third tooth portion adjacent thereto are integrally joined in a V shape at a second tooth end joint portion, whereby the iron core member is formed as one continuous sheet.

An inner rotor type stator for rotating electrical machine according to the present invention is an inner rotor type stator for rotating electrical machine including: a ring-shaped stacked iron core having stacked divided yoke portions, and stacked tooth portions extending from the stacked divided yoke portions and having an identical shape; and a coil provided in slot portions of the stacked iron core, each stacked layer of the inner rotor type stator being composed of an iron core member. The iron core member includes: a plurality of first divided yoke portions; a plurality of second divided yoke portions arranged alternately with the first divided yoke portions; a first tooth portion extending from one circumferential end of each first divided yoke portion, and a second tooth portion extending from the other circumferential end thereof; and a third tooth portion extending from one circumferential end, of each second divided yoke portion, which is on a second tooth portion side, and a fourth tooth portion extending from the other circumferential end thereof. A first recess forming a corresponding one of the slot portions is formed between the first tooth portion and the second tooth portion extending from each first divided yoke portion. A second recess forming a corresponding one of the slot portions is formed between the third tooth portion and the fourth tooth portion extending from each second divided yoke portion. The first tooth portion, and the fourth tooth portion adjacent thereto are used for composing a corresponding one of the stacked tooth portions. The second tooth portion, and the third tooth portion adjacent thereto are used for composing a corresponding one of the stacked tooth portions. A tooth end portion of the first tooth portion and a tooth end portion of the fourth tooth portion adjacent thereto are integrally joined in a V shape at a first tooth end joint portion, and a tooth end portion of the second tooth portion and a tooth end portion of the third tooth portion adjacent thereto are integrally joined in a V shape at a second tooth end joint portion, whereby the iron core member is formed as one continuous sheet. The inner rotor type stator for rotating electrical machine has one or more sheets of the iron core members and the coil.

A method for manufacturing an inner rotor type stator for rotating electrical machine according to the present invention is a method for manufacturing an inner rotor type stator for rotating electrical machine including: a ring-shaped stacked iron core having stacked divided yoke portions, and stacked tooth portions extending from the stacked divided yoke portions and having an identical shape; and a coil provided in slot portions of the stacked iron core, each stacked layer of the inner rotor type stator being composed of an iron core member. The iron core member includes: a plurality of first divided yoke portions; a plurality of second divided yoke portions arranged alternately with the first divided yoke portions; a first tooth portion extending from one circumferential end of each first divided yoke portion, and a second tooth portion extending from the other circumferential end thereof; and a third tooth portion extending from one circumferential end, of each second divided yoke portion, which is on a second tooth portion side, and a fourth tooth portion extending from the other circumferential end thereof. A first recess forming a corresponding one of the slot portions is formed between the first tooth portion and the second tooth portion extending from each first divided yoke portion. A second recess forming a corresponding one of the slot portions is formed between the third tooth portion and the fourth tooth portion extending from each second divided yoke portion. The first tooth portion, and the fourth tooth portion adjacent thereto are used for composing a corresponding one of the stacked tooth portions. The second tooth portion, and the third tooth portion adjacent thereto are used for composing a corresponding one of the stacked tooth portions. A tooth end portion of the first tooth portion and a tooth end portion of the fourth tooth portion adjacent thereto are integrally joined in a V shape at a first tooth end joint portion, and a tooth end portion of the second tooth portion and a tooth end portion of the third tooth portion adjacent thereto are integrally joined in a V shape at a second tooth end joint portion, whereby the iron core member is formed as one continuous sheet having a ring shape. The method includes: a stacking step of stacking plural sheets of the iron core members to form a stacked iron core member; a coil placing step of inserting a plurality of the coils into an inner circumference side of the stacked iron core member from an axial direction of the stacked iron core member, to place the plurality of coils so as to be opposed to the slot portions; and a coil attaching step of pressing the stacked iron core member from an outer circumference side of the stacked iron core member, to close a gap between a stacked first divided yoke portion obtained by stacking the first divided yoke portions, and a stacked second divided yoke portion obtained by stacking the second divided yoke portions adjacent thereto, a V-shaped gap between a stacked first tooth portion obtained by stacking the first tooth portions, and a stacked fourth tooth portion obtained by stacking the fourth tooth portions adjacent thereto, and a V-shaped gap between a stacked second tooth portion obtained by stacking the second tooth portions, and a stacked third tooth portion obtained by stacking the third tooth portions adjacent thereto, thereby attaching the coils to the slot portions.

Effect of the Invention

According to the iron core member, the inner rotor type stator for rotating electrical machine, and the method for manufacturing an inner rotor type stator for rotating electrical machine according to the present invention, the inner diameter of the stacked iron core member can be reduced by closing a groove provided between the first stacked tooth portion and the second stacked tooth portion. Therefore, the stacked tooth portions of the stacked iron core can be inserted into a coil by forming the coil, inserting the coil inside the stacked iron core member from the axial direction of the stacked iron core member, and then equally pushing the stacked iron core member toward the center in the radial direction from the outer circumference side of the stacked iron core member. In this case, it is not necessary to physically divide the stacked iron core. Therefore, the number of components can be reduced, and productivity of the inner rotor type stator can be improved.

Since the deformation portions of the iron core member are present in the first tooth portion, the second tooth portion, the third tooth portion, and the fourth tooth portion, the coil and the stacked iron core member do not interfere with each other when the stacked tooth portions are inserted into the coil. Therefore, it is not necessary to provide a dead space for assembly, and a space factor is improved, whereby the size of the rotating electrical machine can be reduced and output thereof can be enhanced.

When the stacked tooth portions are inserted, it is not necessary to deform the coil itself. Therefore, a round wire or a rectangular wire having a large sectional area can be used. As a result, a space factor of the coil is improved, whereby the size of the rotating electrical machine can be reduced and output thereof can be enhanced. Since deterioration in an insulating coat due to deformation of the coil itself does not occur, reliability of coil insulation can be improved.

In a distributed-winding motor, the stacked iron core member is seamless and continuous across a plurality of coils for a plurality of phases. Therefore, accuracy of a pitch between teeth in the circumferential direction is improved, whereby an effect of reducing cogging torque and torque ripple is provided.

DESCRIPTION OF EMBODIMENTS

Embodiment 1

Hereinafter, an iron core member, an inner rotor type stator, a method for manufacturing an inner rotor type stator, and a rotating electrical machine according to embodiment 1 of the present invention will be described with reference to the drawings.

Figure 1:
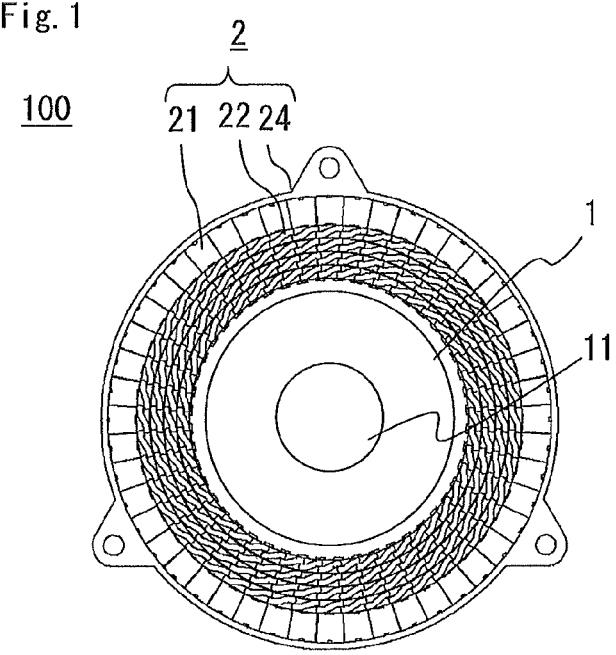
FIG. 1 is a plan view and a side view of a rotating electrical machine according to embodiment 1 of the present invention.
Figure 1:
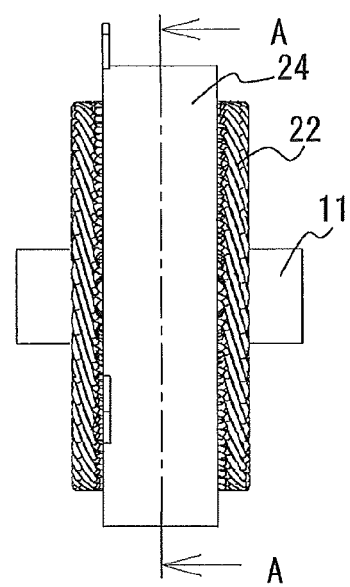

FIG. 1(a) is a plan view of a rotating electrical machine 100 according to embodiment 1 of the present invention.

FIG. 1(b) is a side view of the rotating electrical machine 100 according to embodiment 1 of the present invention.

Figure 2:
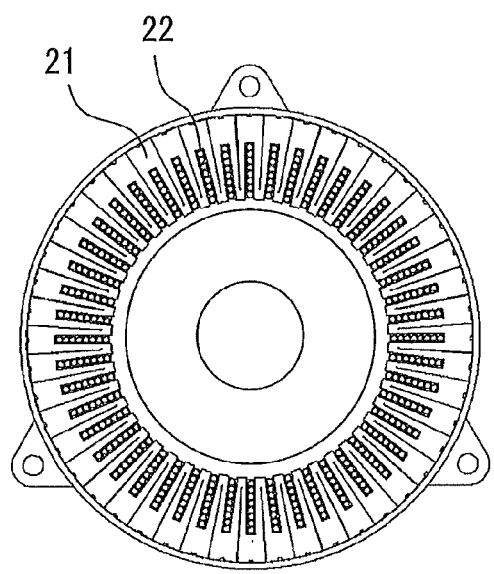
FIG. 2 is a sectional view along A-A line in FIG. 1(b).

FIG. 2 is a sectional view along A-A line in FIG. 1(b).

Figure 3:
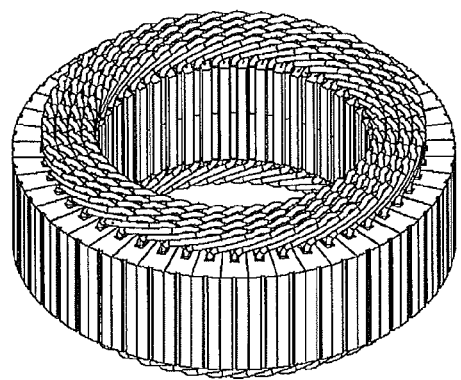
FIG. 3 is a perspective view of a stator according to embodiment 1 of the present invention.

FIG. 3 is a perspective view of a stator 2.

Figure 4:
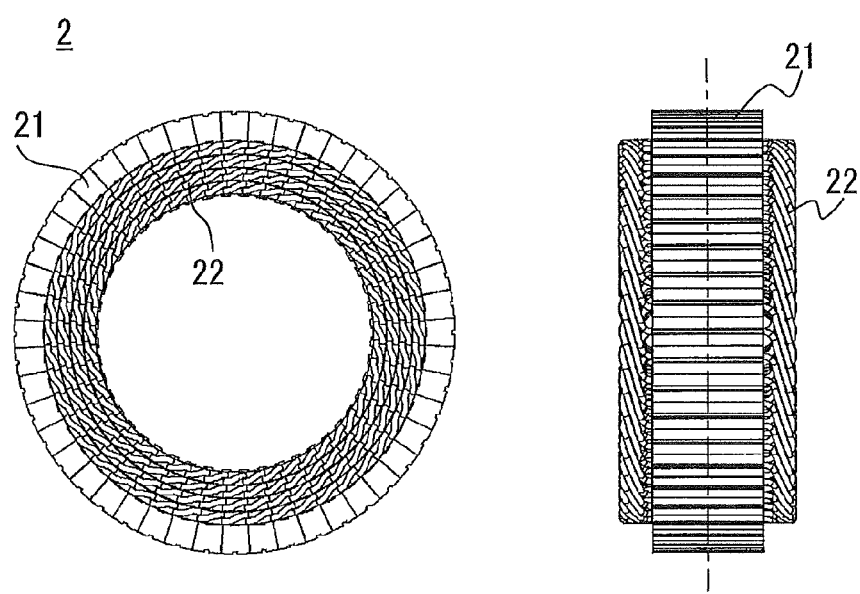
FIG. 4 is a plan view and a side view of the stator according to embodiment 1 of the present invention.

FIG. 4(a) is a plan view of the stator 2.

FIG. 4(b) is a side view of the stator 2.

The rotating electrical machine 100 includes a rotor 1 having a rotary shaft 11, and a stator 2 which is an inner rotor type stator. The stator 2 includes a stacked iron core 21 through which a magnetic flux passes, a coil 22 for making the stator 2 into a field system, and a frame 24 for holding the stacked iron core 21. The stacked iron core 21 is formed by stacking an iron core member manufactured by stamping a magnetic steel sheet by a press, in order to suppress eddy current loss. In the following description, unless otherwise described, a "radial direction" means a radial direction of the stacked iron core 21. Similarly, a "circumferential direction" means a circumferential direction of the stacked iron core 21.

Figure 5:
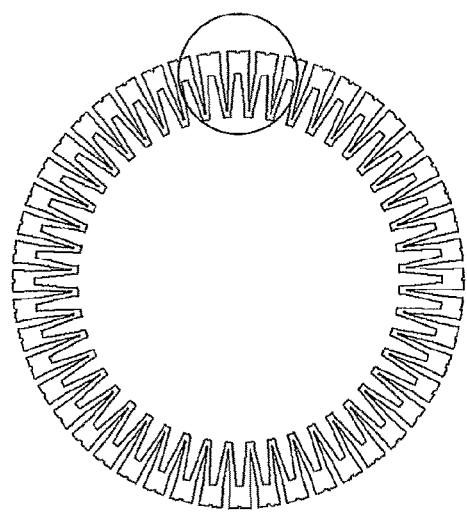
FIG. 5 is a plan view and a major part enlarged view of an iron core member according to embodiment 1 of the present invention.
Figure 5:
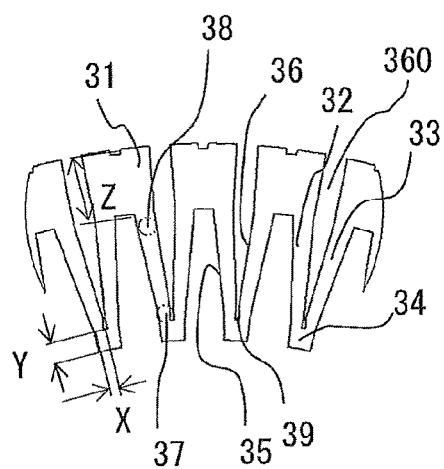

FIG. 5(a) is a plan view of an iron core member 3 composing the stacked iron core 21.

FIG. 5(b) is an enlarged view of a part enclosed by a circle in FIG. 5(a).

As shown in FIG. 5(a), the iron core member 3 is a member obtained by stamping a magnetic steel sheet into an integral ring shape.

In the iron core member 3, an end of a first tooth portion 32 (in claims, corresponding to a first tooth portion or a third tooth portion; the same applies hereinafter, excluding embodiment 7) extending radially inward from one circumferential end of a divided yoke portion 31 (in claims, corresponding to a first divided yoke portion or a second divided yoke portion; the same applies hereinafter, excluding embodiment 7) divided in the circumferential direction, and an end of a second tooth portion 33 (in claims, corresponding to a second tooth portion or a fourth tooth portion; the same applies hereinafter, excluding embodiment 7), are integrally joined at an end joint portion 34. Between the first tooth portion 32 and the second tooth portion 33 extending from one divided yoke portion 31, a recess 35 (in claims, corresponding to a first recess or a second recess; the same applies hereinafter, excluding embodiment 7) is formed which opens inward of the iron core member 3. The recess 35 becomes a slot portion for accommodating the coil 22, when the iron core members 3 are stacked.

The first tooth portion 32 and the second tooth portion 33 that are adjacent and extend from the adjacent two divided yoke portions 31 form a groove 36 having a V shape therebetween. The first tooth portion 32 and the second tooth portion 33, when the iron core members 3 are stacked, become a stacked first tooth portion (in claims, corresponding to a stacked first tooth portion or a stacked third tooth portion; the same applies hereinafter, excluding embodiment 7), and a stacked second tooth portion (in claims, corresponding to a stacked second tooth portion or a stacked fourth tooth portion; the same applies hereinafter, excluding embodiment 7). The stacked first tooth portion and the stacked second tooth portion form one stacked tooth portion of the stator iron core. The stacked tooth portions all have the same shape.

The groove 36 is communicated with a gap at a discontinuous part between the adjacent divided yoke portions 31, and opens outward of the iron core member 3. The gap at the discontinuous part and the groove 36 integrally form a slit 360 extending toward a central axis of the stacked iron core from an outer circumferential surface of the iron core member 3, and extending along the axial direction of the stacked iron core 21. The slits 360 equally divide the iron core member 3 in the radial direction, excluding an end of each tooth. The groove 36 becomes a stacked groove when the iron core members 3 are stacked. An angle between both circumferential end surfaces of each divided yoke portion 31 has such a degree that allows all the divided yoke portions 31 of the iron core member 3 to be joined in a ring shape when the iron core member 3 is equally contracted from outside until the gaps between the divided yoke portions 31 are closed. It is desirable that the first tooth portion 32 and the second tooth portion 33 have a taper shape so as to gradually taper inward of the iron core member 3.

When all the divided yoke portions 31 of the iron core member 3 are joined in a ring shape, the first tooth portion 32 and the second tooth portion 33 extending from the adjacent divided yoke portions are deformed so as to close the groove 36 in the circumferential direction. Portions mainly deformed at this time are a deformation portion 37 and a deformation portion 38 shown in FIG. 5(b). Thus, when the groove 36 is closed, the first tooth portion 32 and the second tooth portion 33 form one tooth portion.

A notch 39 having a curved surface shape smoothly formed may be provided at a radial inner end of the groove 36, i.e., a branch portion (in claims, corresponding to a first branch portion or a second branch portion; the same applies hereinafter, excluding embodiment 7) where the first and second tooth portions branch from the end joint portion 34 (in claims, corresponding to a first tooth end joint portion or a second tooth end joint portion; the same applies hereinafter, excluding embodiment 7). If such a notch 39 having a curved surface shape is formed at that portion, the end of the groove 36 does not have an edge shape. Therefore, the life of a die used for manufacturing the iron core member 3 can be prolonged, and the manufacturing cost can be reduced.

It is desirable that a length Y (a radial length of the end joint portion 34) between a radial inner end of the groove 36 and an inner endmost portion of the tooth is greater than a circumferential width X (a width of one divided tooth) of an end of each of the first tooth portion 32 and the second tooth portion 33. Thus, rigidity of the end joint portion 34 increases, whereby stress acting on the tooth end portion can be reduced while stress is concentrated on the deformation portions 37 and 38. The tooth end portion is a portion on which a magnetic flux is most concentrated, and is likely to be magnetically saturated. Therefore, if stress at this part is reduced, deterioration in a magnetic property is suppressed, whereby an effect of enhancing output of the rotating electrical machine 100 is provided.

Since the shape of the tooth end portion greatly contributes to suppression of cogging torque and torque ripple, shape accuracy at this portion is important. If the length Y is greater than the width X, the tooth end portion is not plastically deformed, and therefore accuracy in stamping of the iron core member 3 can be maintained. As a result, an effect of suppressing cogging torque and torque ripple is provided.

Using the iron core member 3 obtained by stamping a magnetic steel sheet into a ring shape provides an effect of improving circularity of the stacked iron core 21. At this time, if an iron core member for a rotor is stamped at the same time so as to be positioned inside the iron core member 3, material yield can also be improved.

Figure 6:
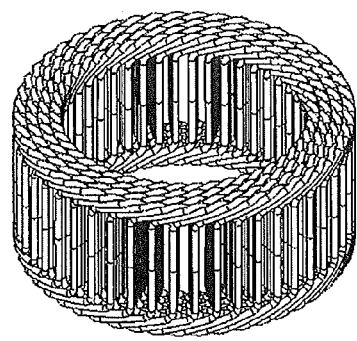
FIG. 6 is a perspective view of a stator coil according to embodiment 1 of the present invention.

FIG. 6 is a perspective view of the coil 22 for the stator according to embodiment 1.

Figure 7:
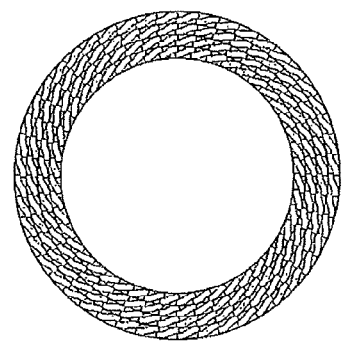
FIG. 7 is a plan view and a side view of the stator coil according to embodiment 1 of the present invention.
Figure 7:
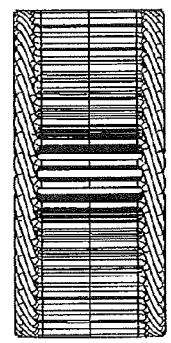

FIG. 7(a) is a plan view of the coil 22.

FIG. 7(b) is a side view of the coil 22.

The coil 22 is formed in advance so that a predetermined number of turns thereof will be placed in each predetermined slot portion of the stacked iron core 21. In these figures, a round wire is used as a wire of the coil 22, but a rectangular wire may be used instead of the round wire. Using a rectangular wire can improve a space factor of the coil, thereby reducing the size of the rotating electrical machine and enhancing output thereof. Alternatively, bundled thin wires may be used. Using bundled thin wires can reduce flexural rigidity of a wire, thereby facilitating formation of the coil and improving productivity of products.

Next, a method for manufacturing a stator by inserting stacked tooth portions of a stacked iron core member formed by stacking the iron core members 3 into the coil 22 will be described.

Figure 8:
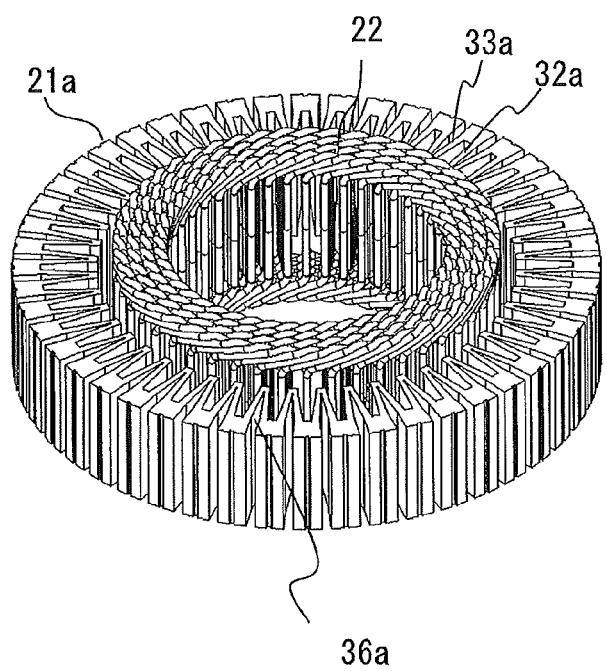
FIG. 8 is a perspective view showing a state just before a stacked iron core member is inserted into the coil, according to embodiment 1 of the present invention.

FIG. 8 is a perspective view showing a state just before stacked tooth portions (each formed by a combination of a first stacked tooth portion 32a and a second stacked tooth portion 33a; the same applies hereinafter) of a stacked iron core member 21a are inserted into the coil 22, according to embodiment 1.

A difference between the aforementioned stacked iron core 21 and the stacked iron core member 21a is as follows: the stacked iron core member 21a corresponds to the iron core members 3 that are merely stacked, and the stacked iron core 21 is obtained by contracting the stacked iron core member 21a radially inward.

Figure 9:
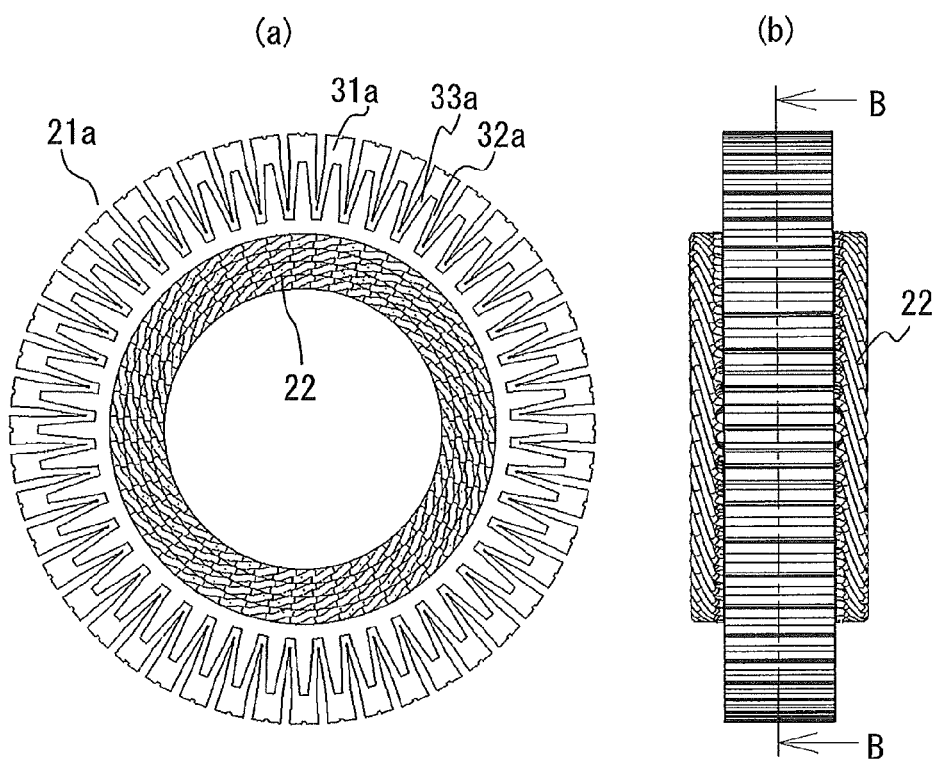
FIG. 9 is a plan view and a side view showing the state just before the stacked iron core member is inserted into the coil, according to embodiment 1 of the present invention.

FIG. 9(a) is a plan view showing a state just before the stacked tooth portions of the stacked iron core member 21a are inserted into the coil 22.

FIG. 9(b) is a side view showing the state just before the stacked tooth portions of the stacked iron core member 21a are inserted into the coil 22.

Figure 10:
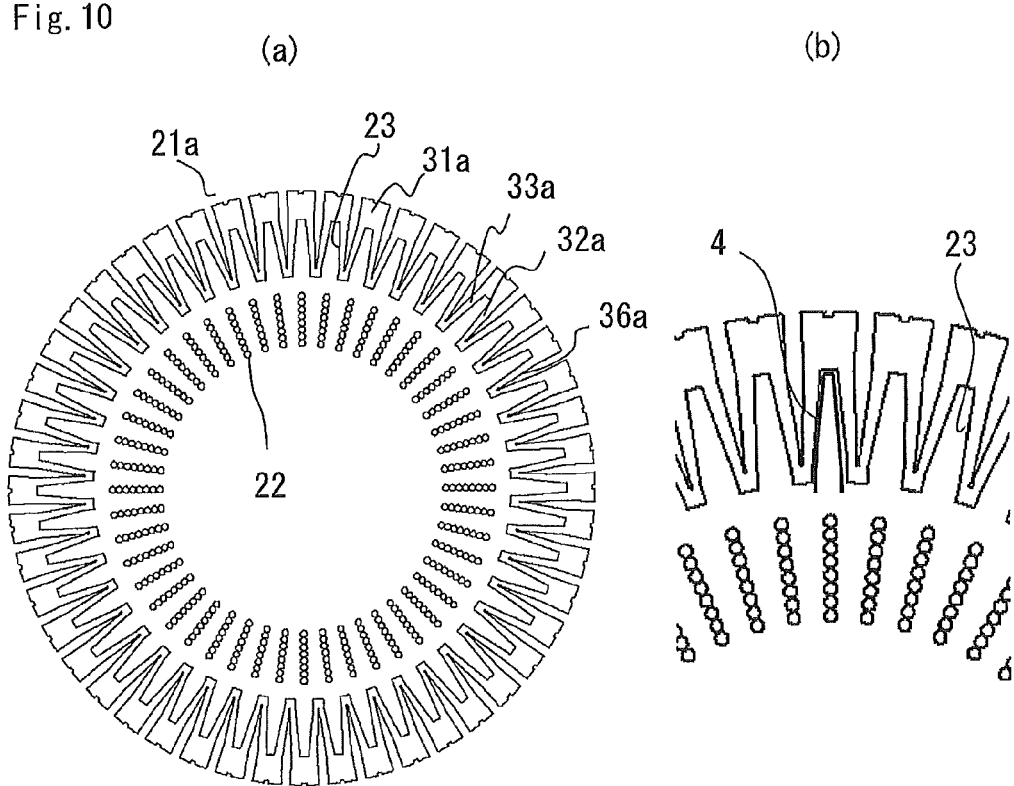
FIG. 10 is a sectional view along B-B line in FIG. 9(b), and a major part enlarged view thereof.

FIG. 10(a) is a sectional view along B-B line in FIG. 9(b).

FIG. 10(b) is a major part enlarged view of FIG. 10(a).

The inner diameter of the iron core member 3 composing the stacked iron core member 21a is greater than at least the outer diameter of the coil 22. Thus, as shown in FIG. 8, the stacked iron core member 21a before the coil 22 is attached thereto can be moved relative to the coil 22 in the axial direction in order to arrange them. As shown in FIG. 10(b), in a slot portion 23, an insulating member 4 may be inserted for insulating the stacked iron core member 21a and the coil 22 from each other.

Inserting the insulating member 4 provides an effect of improving insulation performance for the coil 22.

The slot portion 23 has no joint surfaces in the circumferential direction. Therefore, the insulating member 4 is prevented from being pinched between such joint surfaces when each stacked tooth portion of the stacked iron core member 21a is inserted into the coil 22 in the radial direction. Thus, reduction of insulation performance due to pinching of the insulating member can be suppressed.

The opening angle of the insulating member 4 is greater than the opening angle of the slot portion 23, whereby pressure can be generated between the insulating member 4 and the stacked iron core 21 when the insulating member 4 is inserted into the slot portion 23. Owing to the self-holding effect by the pressure, the insulating member 4 can be temporarily fixed in the slot portion 23 without using fixing means such as bonding. Thus, an effect of simplifying the manufacturing process and reducing the manufacturing cost for the stator 2 is provided. In addition, since a material such as an adhesive agent is not used, an effect of reducing the material cost is provided.

Figure 11:
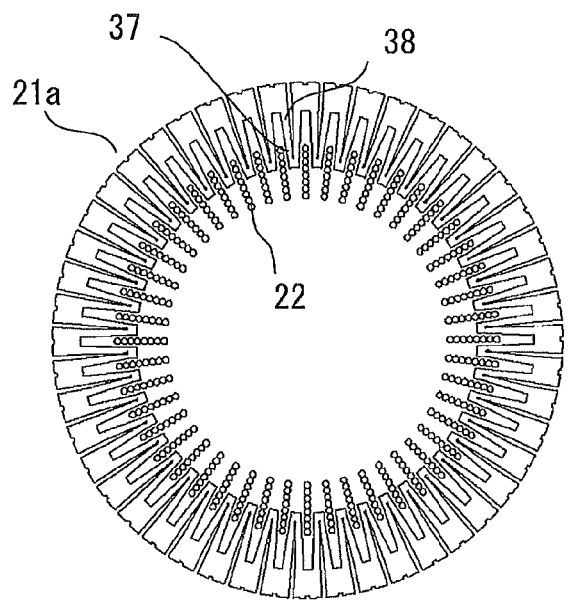
FIG. 11 is a sectional view showing a process for inserting the stacked iron core member into the coil, according to embodiment 1 of the present invention.
Figure 12:
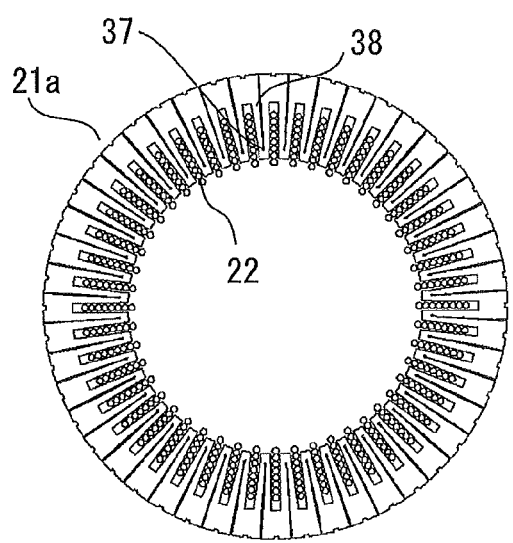
FIG. 12 is a sectional view showing the process for inserting the stacked iron core member into the coil, according to embodiment 1 of the present invention.
Figure 13:
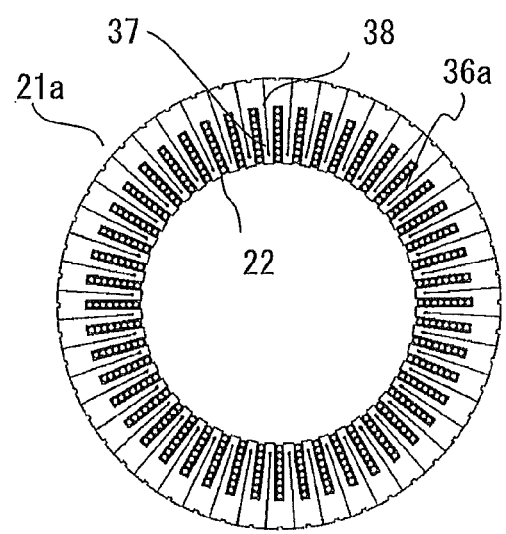
FIG. 13 is a sectional view showing the process for inserting the stacked iron core member into the coil, according to embodiment 1 of the present invention.

FIG. 11 to FIG. 13 are views showing a process for inserting the stacked tooth portions of the stacked iron core member 21a into the coil 22.

The stacked iron core member 21a is equally pressurized from the outer circumferential side thereof toward the center in the radial direction, whereby the stacked tooth portions of the stacked iron core member 21a are inserted into the coil 22 in order of FIG. 11, FIG. 12, and then FIG. 13. When each stacked tooth portion of the stacked iron core member 21a is inserted into the coil 22, the deformation portion 37 and the deformation portion 38 of each iron core member 3 are gradually deformed in a direction to close a stacked groove 36a (in claims, corresponding to a V-shaped gap). Then, the stacked tooth portions of the stacked iron core member 21a are inserted into the coil 22 in the radial direction. During the insertion, stacked divided yoke portions 31a of the stacked iron core member 21a may be pressurized in the axial direction to a slidable degree. Thus, pressurizing the stacked iron core member 21a in the axial direction suppresses out-of-plane deformation of the stacked iron core member 21a and improves shape accuracy, thereby providing an effect of reducing cogging torque and torque ripple.

As shown in FIG. 13, when the outer circumferential surface of the stacked iron core member 21a is pressurized toward the center in the radial direction until the stacked grooves 36a are closed, insertion of the stacked iron core member 21a into the coil 22 is completed, whereby the stator 2 shown in FIG. 3 is formed. As compared to the case of combining divided stacked iron cores and then inserting them into a coil, the number of components is reduced. Therefore, an effect of improving productivity is provided.

The stacked iron core 21 of the stator 2 is seamless and continuous across a plurality of coils for a plurality of phases. Therefore, accuracy of a pitch between teeth in the circumferential direction is improved, whereby an effect of suppressing cogging torque and torque ripple is provided.

Since the stacked iron core member 21a is integrally and continuously formed, it is easy to synchronously insert all the stacked tooth portions into the coil 22. Thus, an effect of improving productivity of the stator 2 and an effect of simplifying a facility and suppressing facility investment are provided. The stator 2 is fixed by fixing means such as press-fit or shrink-fit into the frame 24. Since the stator 2 is obtained as described above, the number of components can be reduced, whereby an effect of improving productivity and reducing the manufacturing cost is provided.

Since it is not necessary to provide a dead space as in the conventional case, a space factor of the coil is improved, whereby an effect of improving output of the rotating electrical machine is provided. Although the present embodiment has shown a stacked iron core, the same operation and effect are provided also in the case of using, as the iron core, a single-body stator iron core having the same plan-view shape as the stator 2.

Embodiment 2

Hereinafter, an iron core member, an inner rotor type stator, a method for manufacturing an inner rotor type stator, and a rotating electrical machine according to embodiment 2 of the present invention will be described with reference to the drawings, focusing on a difference from embodiment 1.

Figure 14:
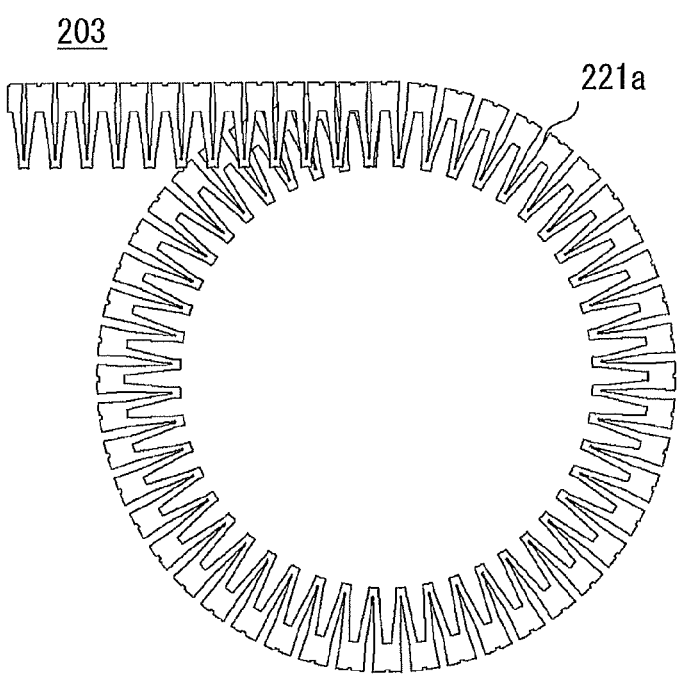
FIG. 14 is a plan view showing a process for stacking an iron core member into a stacked iron core member, according to embodiment 2 of the present invention.

FIG. 14 is a plan view showing a process of stacking a stacked iron core member 221a using an iron core member 203 in the present embodiment.

Figure 15:
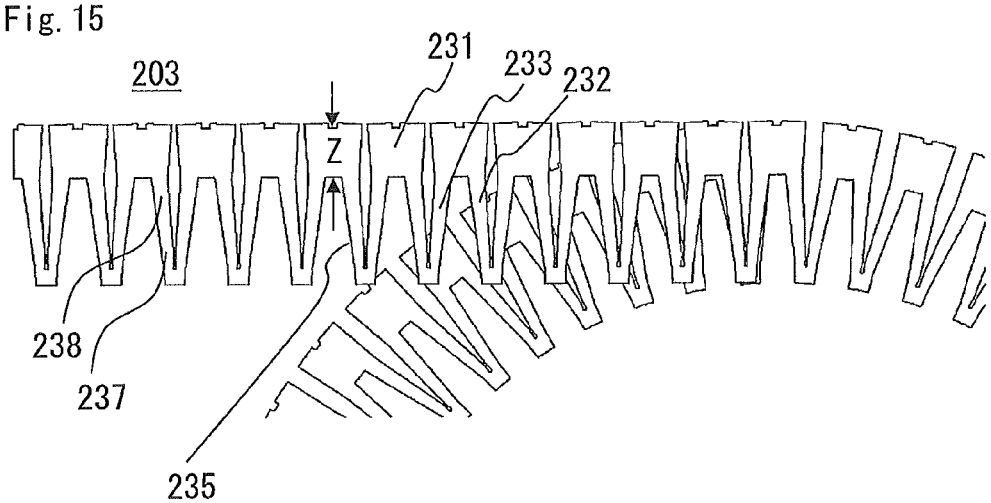
FIG. 15 is a major part enlarged view of FIG. 14.

FIG. 15 is a major part enlarged view of FIG. 14.

As shown in FIG. 14 and FIG. 15, in the iron core member 203, a first tooth portion 232 and a second tooth portion 233 extend from both ends of each divided yoke portion 231 arranged laterally in a row, and ends of the first tooth portion 232 and the second tooth portion 233 of the adjacent divided yoke portions 231 are integrally joined in a bellows shape. The iron core member 203 stamped in a straight shape is spirally stacked while the deformation portions 237 and 238 of the first and second tooth portions 232 and 233 are deformed to form an arc shape.

In the iron core member 203 according to embodiment 2 of the present invention, since one sheet of iron core member 203 is spirally stacked, material yield can be improved as compared to the case of stamping an iron core member in a ring shape. Even if the stator has a greater length Z between a recess 235 and the outer circumference of the iron core member 203 than the thickness of the steel sheet, the stacked iron core member 221a can be spirally stacked without causing out-of-plane deformation on a yoke portion. Thus, the manufacturing process method can be uniformed for all machine types irrespective of the type of an iron core to be manufactured, whereby productivity of products is improved.

Since the iron core member 203 is stamped in a straight shape from an electromagnetic steel sheet, the stacked iron core can be manufactured so that a rolling direction of the steel sheet becomes constant relative to the radial direction of the iron core. As a result, an effect of suppressing cogging torque and torque ripple due to magnetic anisotropy can be provided. Since the iron core member 203 is spirally stacked, material yield is improved, whereby products can be produced with low cost.

Embodiment 3

Hereinafter, an iron core member, an inner rotor type stator, a method for manufacturing an inner rotor type stator, and a rotating electrical machine according to embodiment 3 of the present invention will be described with reference to the drawings, focusing on a difference from embodiment 1.

Figure 16:
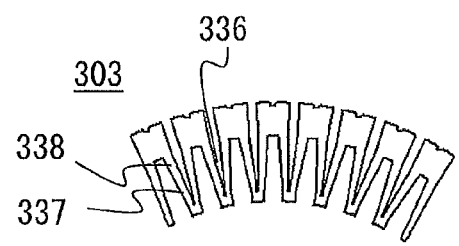
FIG. 16 is a plan view of an iron core member according to embodiment 3 of the present invention.

FIG. 16 is a plan view of an iron core member 303 used in the present embodiment.

Figure 17:
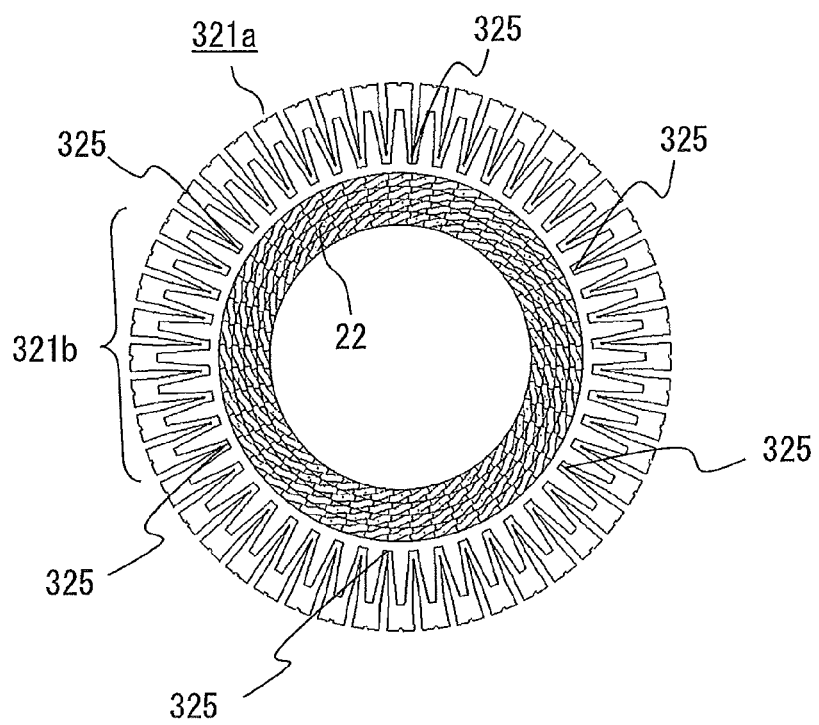
FIG. 17 is a view showing a state just before a stacked iron core member is inserted into a coil, according to embodiment 3 of the present invention.

FIG. 17 is a plan view showing a state just before a stacked iron core member 321a is inserted into the coil 22, according to the present embodiment.

The stacked iron core member 321a is the same as the stacked iron core member 21a of embodiment 1 except that the stacked iron core member 321a is formed by a combination of six divided stacked iron core members 321b equally divided in the circumferential direction and having hollow fan shapes. The stacked iron core member 321a is equally divided into six parts in the circumferential direction via each division surface 325. Dividing the stacked iron core member 321a provides an effect of improving material yield. Here, it is desirable that each individual divided stacked iron core member 321b is continuously formed across at least a plurality of coils for a plurality of phases. The continuous formation across a plurality of coils for a plurality of phases improves accuracy of a pitch between teeth in the circumferential direction, thereby providing an effect of suppressing cogging torque and torque ripple.

Figure 18:
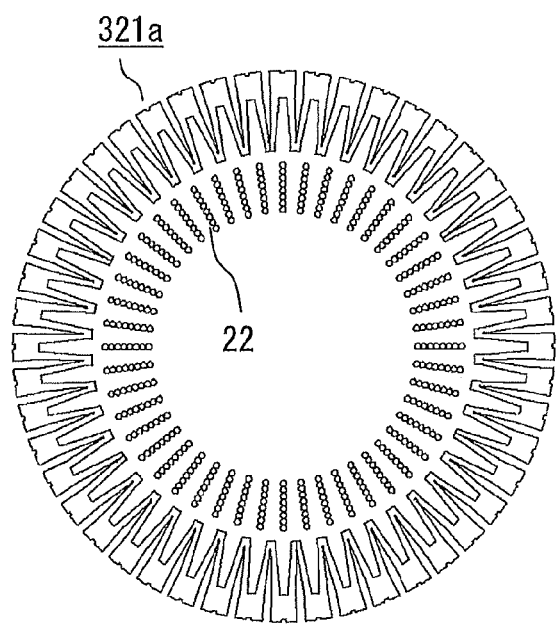
FIG. 18 is a sectional view showing a process for inserting the stacked iron core member into the coil, according to embodiment 3 of the present invention.

FIG. 18 is a sectional view of the stacked iron core member 321a and the coil 22 along a direction perpendicular to the axial direction.

As shown in FIG. 18, the stacked iron core member 321a is placed radially outside the coil 22. In the present embodiment, it is not necessary to move the stacked iron core member 321a in the axial direction relative to the coil 22 in order to arrange them, but the divided stacked iron core members 321b may be individually placed from the radial direction. Placing the divided stacked iron core members 321b from the radial direction facilitates assembly of a stator 302.

Figure 19:
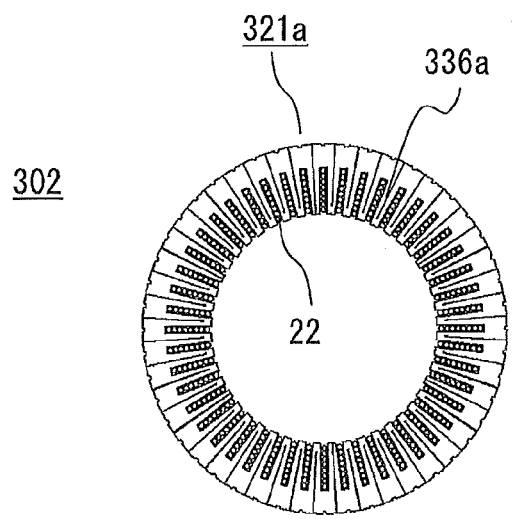
FIG. 19 is a sectional view of a stator according to embodiment 3 of the present invention.

FIG. 19 is a sectional view of the stator 302 after stacked tooth portions of the stacked iron core member 321a are inserted into the coil 22.

When the outer circumferential surface of the stacked iron core member 321a is pressurized toward the center in the radial direction, deformation portions 337 and 338 in FIG. 16 are deformed in a direction to close a stacked groove 336a, and the stacked tooth portions of the stacked iron core member 321a are inserted into the coil 22. This point is the same as in embodiment 1.

In the stator 302 obtained as described above, a stacked iron core 321 composing the stator 302 is divided. Therefore, an effect of improving material yield as compared to the case of stamping an iron core member in a ring shape is provided. If the stacked iron core 321 is divided so as to be continuously across a plurality of coils for a plurality of phases, accuracy of a pitch between teeth in the circumferential direction is improved, whereby an effect of suppressing cogging torque and torque ripple is provided. Each divided stacked iron core member 321b composing the stacked iron core member 321a can be individually placed from the radial direction. Therefore, an effect of facilitating assembly and reducing the manufacturing cost is provided.

Embodiment 4

Hereinafter, an iron core member, an inner rotor type stator, a method for manufacturing an inner rotor type stator, and a rotating electrical machine according to embodiment 4 of the present invention will be described with reference to the drawings, focusing on a difference from embodiments 1 to 3.

Figure 20:
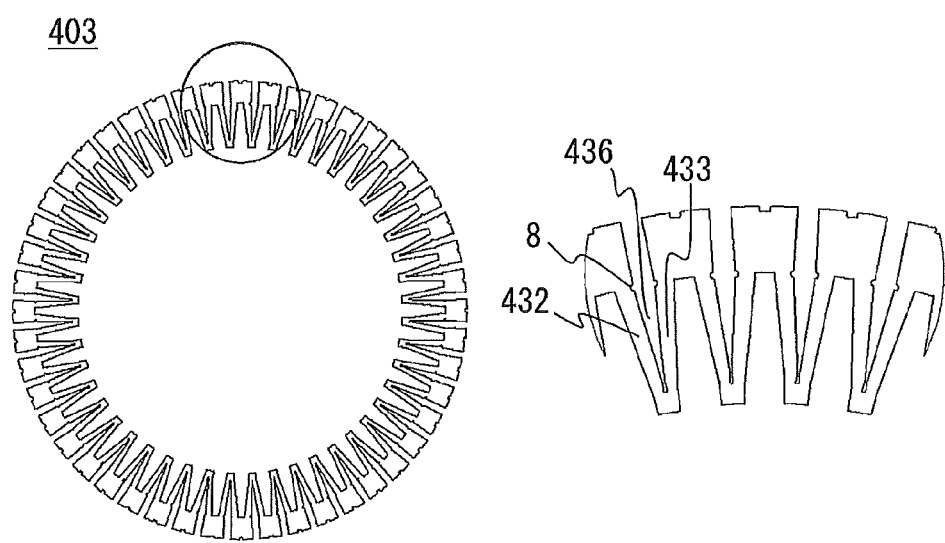
FIG. 20 is a plan view and a major part enlarged view of an iron core member according to embodiment 4 of the present invention.

FIG. 20(a) is a plan view of an iron core member 403 according to the present embodiment.

FIG. 20(b) is an enlarged view of a part enclosed by a circle in FIG. 20(a).

A basic configuration of the iron core member 403 is the same as in embodiment 1. Semicircular cutouts 8 are formed at base portions of circumferential outer side surfaces of a first tooth portion 432 and a second tooth portion 433. Forming the cutouts 8 at these portions allows for reduction in force for inserting stacked tooth portions of a stacked iron core member into the coil 22. Thus, an effect of reducing the cost for the facility is provided.

In addition, if the cutouts 8 are formed, stress is concentrated on the base portions of the first tooth portion 432 and the second tooth portion 433. Therefore, stress acting on central portions of the first tooth portion 432 and the second tooth portion 433 is reduced, whereby deterioration in a magnetic property due to the stress can be suppressed and output of the rotating electrical machine can be enhanced.

Embodiment 5

Hereinafter, an iron core member, an inner rotor type stator, a method for manufacturing an inner rotor type stator, and a rotating electrical machine according to embodiment 5 of the present invention will be described with reference to the drawings, focusing on a difference from embodiments 1 to 4.

Figure 21:
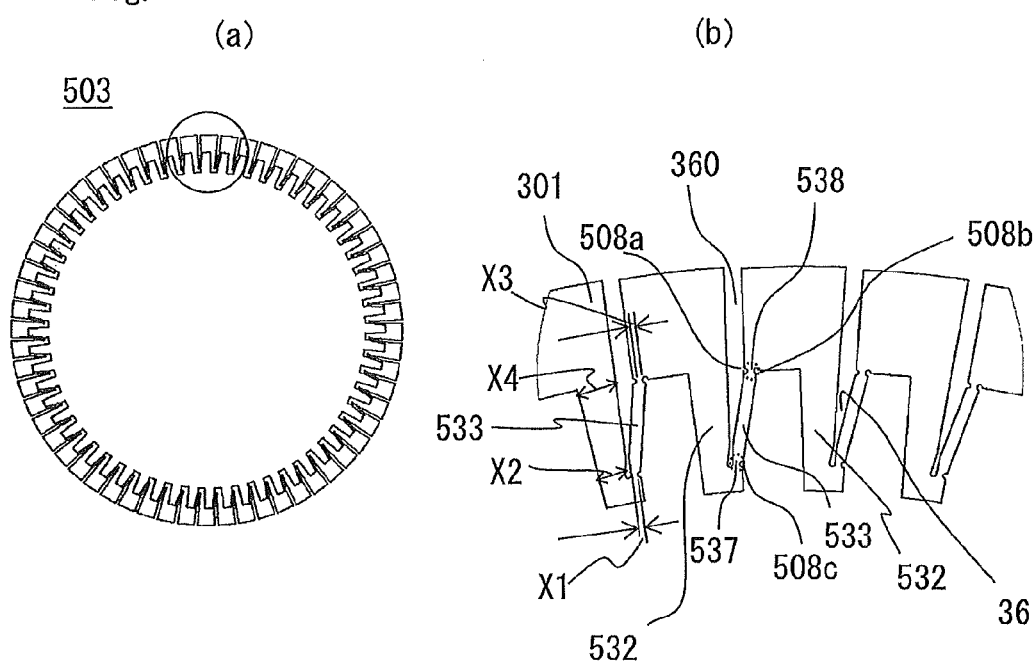
FIG. 21 is a plan view and a major part enlarged view of an iron core member according to embodiment 5 of the present invention.

FIG. 21(a) is a plan view of an iron core member 503 according to the present embodiment.

FIG. 21(b) is an enlarged view of a part enclosed by a circle in FIG. 21(a).

The iron core member 503 has the same configuration as in embodiment 1 except for the configurations of the first tooth portion and the second tooth portion. A circumferential width X2 of a tooth end portion of a first tooth portion 532 is greater than a circumferential width X1 of a tooth end portion of a second tooth portion 533. A circumferential width X4 of a base portion of the first tooth portion 532 is greater than a circumferential width X3 of a base portion of the second tooth portion 533. The first tooth portion 532 and the second tooth portion 533 are alternately arranged in the circumferential direction.

Since the circumferential widths of the first tooth portion 532 and the second tooth portion 533 are different, portions to be deformed when the first tooth portion 532 and the second tooth portion 533 close the groove 36 in the circumferential direction are a deformation portion 537 and a deformation portion 538 of the second tooth portion 533 which is the thinner one as shown in FIG. 21(b). Semicircular cutouts 508a and 508b are formed at base portions of circumferential outer side surfaces of the second tooth portion 533. A cutout 508c is formed at a tooth end portion of a circumferential outer side surface of the second tooth portion 533. Although the iron core member 503 has three cutouts 508a, 508b, and 508c, only one of them may be used or two of them may be combined.

In the iron core member 503 according to embodiment 5 of the present invention, at the time of deformation in a direction to close a stacked groove, stress is concentrated on the deformation portions 537 and 538 of the thinner second tooth portion 533, and thus the inner diameter of the stacked iron core member can be reduced with a small force, as compared to the case where the first tooth portion and the second tooth portion have the same circumferential width. As a result, an effect of downsizing the manufacturing facility and suppressing facility investment is provided.

Since stress applied to the first tooth portion 532 is reduced, as compared to the case where the first tooth portion 532 and the second tooth portion 533 have the same circumferential width, increase in iron loss due to stress strain is suppressed, whereby an effect of enhancing output is provided.

In the case of forming a stacked iron core member by stacking the iron core members 503, a ratio of the width X1 of the second tooth portion 533 to the axial thickness of the iron core member 503 is smaller than that in the configuration of embodiment 1. As a result, as compared to embodiment 1, out-of-plane deformation of the second tooth portion 533 at the time of deformation in a direction to close a stacked groove can be suppressed and shape accuracy of a stacked iron core is improved, whereby an effect of reducing cogging torque and torque ripple is provided.

Since the cutouts 508a, 508b, and 508c are provided, stress can be concentrated on the deformation portions 537 and 538, whereby the inner diameter of the stacked iron core member can be reduced with a smaller force. As a result, an effect of downsizing the manufacturing facility and suppressing facility investment is provided.

Embodiment 6

Hereinafter, an iron core member, an inner rotor type stator, a method for manufacturing an inner rotor type stator, and a rotating electrical machine according to embodiment 6 of the present invention will be described with reference to the drawings, focusing on a difference from embodiment 5.

Figure 22:
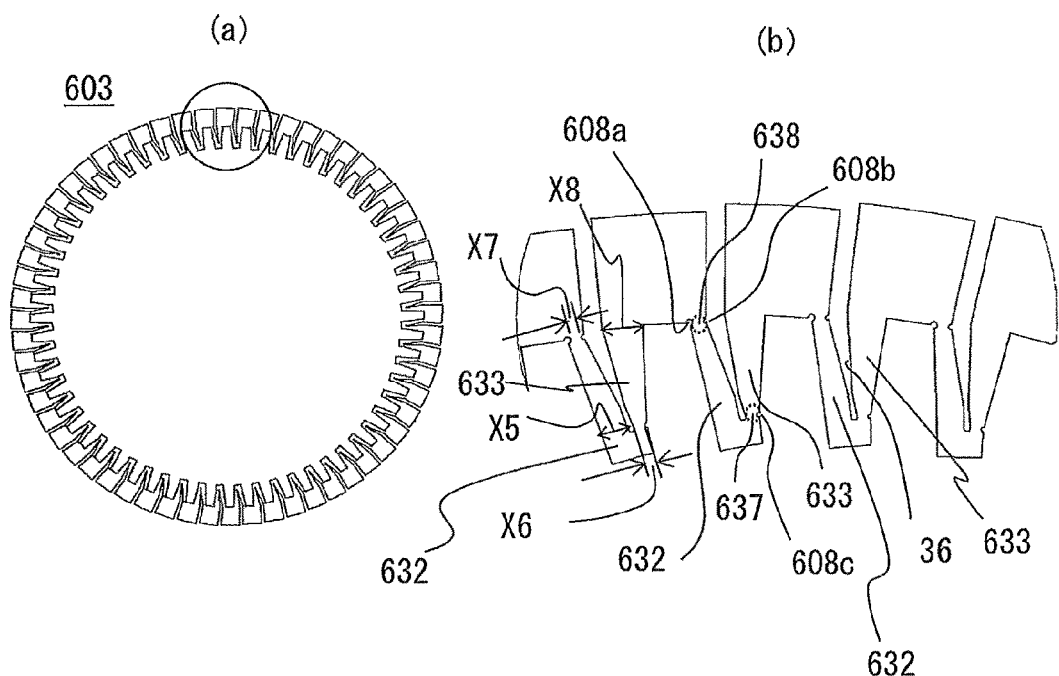
FIG. 22 is a plan view and a major part enlarged view of an iron core member according to embodiment 6 of the present invention.

FIG. 22(a) is a plan view of an iron core member 603 according to the present embodiment.

FIG. 22(b) is an enlarged view of a part enclosed by a circle in FIG. 22(a).

The iron core member 603 is different from embodiment 5 in that the first tooth portion and the second tooth portion each have one deformation portion.

A circumferential width X5 of an end portion of a first tooth portion 632 is greater than a circumferential width X6 of an end portion of a second tooth portion 633. A circumferential width X7 of a base portion of the first tooth portion 632 is smaller than a circumferential width X8 of a base portion of the second tooth portion 633. The first tooth portion 632 and the second tooth portion 633 are alternately formed in the circumferential direction. Portions to be deformed when the first tooth portion 632 and the second tooth portion 633 close the groove 36 in the circumferential direction are a deformation portion 637 of the second tooth portion 633 and a deformation portion 638 of the first tooth portion 632 as shown in FIG. 22(b). Cutouts 608a and 608b are formed at base portions of circumferential outer side surfaces of the first tooth portion 632. A cutout 608c is formed at an end portion of a circumferential outer side surface of the second tooth portion 633.

In the iron core member 603 according to embodiment 6 of the present invention, in addition to the effects described in embodiment 5, since the first tooth portion and the second tooth portion each have one deformation portion, circumferential widths of portions other than the deformation portions of the first tooth portion and the second tooth portion can be enlarged. As a result, deformation of portions other than the deformation portions is suppressed and shape accuracy of the stacked iron core is improved, whereby an effect of improving cogging torque and torque ripple is provided.

Embodiment 7

Hereinafter, an iron core member, an inner rotor type stator, a method for manufacturing an inner rotor type stator, and a rotating electrical machine according to embodiment 7 of the present invention will be described with reference to the drawings, focusing on a difference from embodiments 1 to 6.

Figure 23:
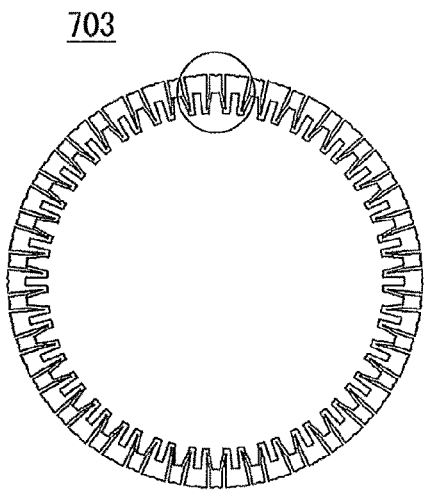
FIG. 23 is a plan view and a major part enlarged view of an iron core member according to embodiment 7 of the present invention.
Figure 23:
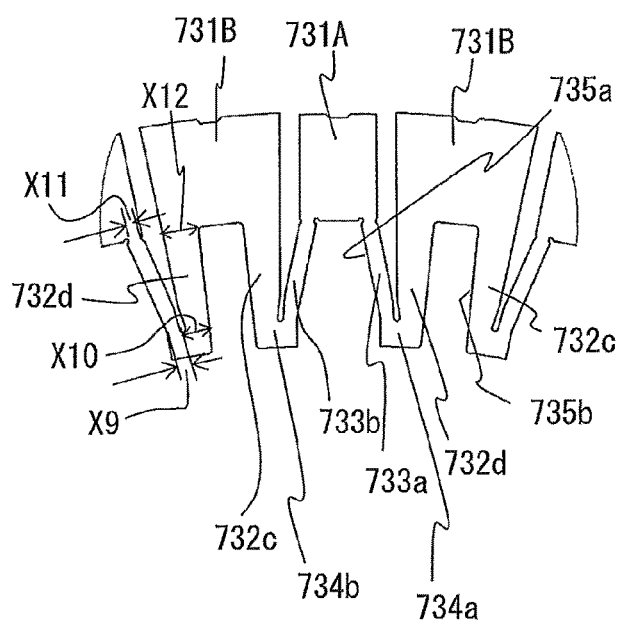

FIG. 23(a) is a plan view of an iron core member 703 according to the present embodiment.

FIG. 23(b) is an enlarged view of a part enclosed by a circle in FIG. 23(a).

In the iron core member 703, a first divided yoke portion 731A and a second divided yoke portion 731B are alternately arranged in the circumferential direction. A first tooth portion 733a extends radially inward from one circumferential end of the first divided yoke portion 731A, and a second tooth portion 733b extends radially inward from the other circumferential end. A third tooth portion 732c extends radially inward from one circumferential end of the second divided yoke portion 731B which is on the second tooth portion 733b side, and a fourth tooth portion 732d extends radially inward from the other circumferential end. That is, the tooth portions are arranged in the circumferential direction in order of the first tooth portion 733a, the second tooth portion 733b, the third tooth portion 732c, and then the fourth tooth portion 732d.

The first tooth portion 733a and the second tooth portion 733b have shapes symmetric in the circumferential direction. The third tooth portion 732c and the fourth tooth portion 732d have shapes symmetric in the circumferential direction. An end of the first tooth portion 733a and an end of the fourth tooth portion 732d are integrally joined at an end joint portion 734a (in claims, corresponding to a first tooth end joint portion). An end of the second tooth portion 733b and an end of the third tooth portion 732c are integrally joined at an end joint portion 734b (in claims, corresponding to a second tooth end joint portion).

Between the first tooth portion 733a and the second tooth portion 733b extending from the first divided yoke portion 731A, a first recess 735a is formed which opens inward of the iron core member 3. Between the third tooth portion 732c and the fourth tooth portion 732d extending from the second divided yoke portion 731B, a second recess 735b is formed which opens inward of the iron core member 3. The first recess 735a and the second recess 735b become slot portions for accommodating the coil 22, when the iron core members 703 are stacked.

A circumferential width X9 of tooth end portions of the first tooth portion 733a and the second tooth portion 733b is smaller than a circumferential width X10 of tooth end portions of the third tooth portion 732c and the fourth tooth portion 732d. A circumferential width X11 of base portions of the first tooth portion 733a and the second tooth portion 733b is smaller than a circumferential width X12 of base portions of the third tooth portion 732c and the fourth tooth portion 732d.

In the iron core member 703 according to embodiment 7 of the present invention, in addition to the effects described in embodiment 5, since the first tooth portion 733a and the second tooth portion 733b are symmetric in the circumferential direction, the rotation characteristics can be made equal between a forward rotation direction and a reverse rotation direction of the rotating electrical machine. For example, in an electric power steering for vehicle, operation feelings in forward rotation and in reverse rotation can be made equal, whereby an effect of improving drivability is provided.

It is noted that, within the scope of the present invention, the above embodiments may be freely combined with each other, or each of the above embodiments may be modified or abbreviated as appropriate.

The invention claimed is:

1. An iron core member composing each stacked layer of an inner rotor type stator for a rotating electrical machine including: a ring-shaped stacked iron core having arc-shaped stacked divided yoke portions, and stacked tooth portions extending from the stacked divided yoke portions and having an identical shape; and a coil provided in slot portions of the stacked iron core, the iron core member comprising:

a plurality of first divided yoke portions;

a plurality of second divided yoke portions arranged alternately with the first divided yoke portions in a circumferential direction, a gap between each of the plurality of first divided yoke portions and a respective adjacent second divided yoke portion of the plurality of second divided yoke portions;

a first tooth portion extending from one circumferential end of each first divided yoke portion, and a second tooth portion extending from the other circumferential end thereof; and a third tooth portion extending from one circumferential end, of each second divided yoke portion, which is on a second tooth portion side, and a fourth tooth portion extending from the other circumferential end thereof, wherein a first recess forming a corresponding one of the slot portions is formed so as to be surrounded by: a circumferential side surface, on a second tooth portion side, of the first tooth portion extending from each first divided yoke portion, a circumferential side surface, on a first tooth portion side, of the second tooth portion extending from the first divided yoke portion; and an inner circumferential surface of the first divided yoke portion, a second recess forming a corresponding one of the slot portions is formed so as to be surrounded by: a circumferential side surface, on a fourth tooth portion side, of the third tooth portion extending from each second divided yoke portion; a circumferential side surface, on a third tooth portion side, of the fourth tooth portion extending from the second divided yoke portion; and an inner circumferential surface of the second divided yoke portion, the first tooth portion, and the fourth tooth portion adjacent thereto are used for composing a corresponding one of the stacked tooth portions, the second tooth portion, and the third tooth portion adjacent thereto are used for composing a corresponding one of the stacked tooth portions, and a tooth end portion of the first tooth portion and a tooth end portion of the fourth tooth portion adjacent thereto are integrally joined in a V shape at a first tooth end joint portion, and a tooth end portion of the second tooth portion and a tooth end portion of the third tooth portion adjacent thereto are integrally joined in a V shape at a second tooth end joint portion, whereby the iron core member is formed as one continuous sheet, the iron core member having a ring shape such that the first tooth portions and the fourth tooth portions adjacent thereto are all configured to be compressible to be joined with each other, and the second tooth portions and the third tooth portions adjacent thereto are all configured to be compressible to be joined with each other to close the gaps between each of the plurality of first divided yoke portions and the respective adjacent second divided yoke portion.

2. The iron core member according to claim 1, the iron core member having a hollow fan shape such that the first tooth portions and the fourth tooth portions adjacent thereto are joined with each other, and the second tooth portions and the third tooth portions adjacent thereto are joined with each other.

3. The iron core member according to claim 1, the iron core member having a bellows shape as a whole such that the first divided yoke portions and the second divided yoke portions are arranged laterally in a row.

4. The iron core member according to claim 1, wherein widths of the tooth end portions of the first tooth portion and the second tooth portion in a circumferential direction of the iron core member are smaller than widths of the tooth end portions of the third tooth portion and the fourth tooth portion in the circumferential direction of the iron core member, widths of base portions of the first tooth portion and the second tooth portion in the circumferential direction of the iron core member are smaller than widths of base portions of the third tooth portion and the fourth tooth portion in the circumferential direction of the iron core member, the first tooth portion and the second tooth portion have shapes symmetric in the circumferential direction of the iron core member, and the third tooth portion and the fourth tooth portion have shapes symmetric in the circumferential direction of the iron core member.

5. The iron core member according to claim 1, wherein a base portion of the first tooth portion and a base portion of the second tooth portion each have a cutout on at least one outer side surface in a circumferential direction of the iron core member, and a base portion of the third tooth portion and a base portion of the fourth tooth portion each have a cutout on at least one outer side surface in the circumferential direction of the iron core member.

6. The iron core member according to claim 1, wherein a first branch portion where the first tooth portion and the fourth tooth portion branch from the first tooth end joint portion, and a second branch portion where the second tooth portion and the third tooth portion branch from the second tooth end joint portion, are smoothly formed.

7. The iron core member according to claim 6, wherein the first branch portion and the second branch portion are formed in a curved-surface shape.

8. The iron core member according to claim 1, wherein the first divided yoke portion and the second divided yoke portion have the same shape, the first tooth portion and the third tooth portion have the same shape, and the second tooth portion and the fourth tooth portion have the same shape.

9. The iron core member according to claim 8, wherein lengths of the first tooth end joint portion and the second tooth end joint portion in a radial direction of the iron core member are greater than widths of ends of the first tooth portion and the second tooth portion in a circumferential direction of the iron core member.

10. The iron core member according to claim 8, wherein a width of the tooth end portion of the first tooth portion in a circumferential direction of the iron core member is greater than a width of the tooth end portion of the second tooth portion in the circumferential direction of the iron core member, and a width of a base portion of the first tooth portion in the circumferential direction of the iron core member is smaller than a width of a base portion of the second tooth portion in the circumferential direction of the iron core member.

11. The iron core member according to claim 8, wherein a width of the tooth end portion of the first tooth portion in a circumferential direction of the iron core member is greater than a width of the tooth end portion of the second tooth portion in the circumferential direction of the iron core member, and a width of a base portion of the first tooth portion in the circumferential direction of the iron core member is greater than a width of a base portion of the second tooth portion in the circumferential direction of the iron core member.

12. The iron core member according to claim 11, wherein the tooth end portion of the second tooth portion has a cutout on an outer side surface thereof in the circumferential direction of the iron core member.

13. An inner rotor type stator for a rotating electrical machine, comprising: a ring-shaped stacked iron core having arc-shaped stacked divided yoke portions, and stacked tooth portions extending from the stacked divided yoke portions and having an identical shape; and a coil provided in slot portions of the stacked iron core, each stacked layer of the inner rotor type stator being composed of an iron core member, wherein the iron core member includes:

a plurality of first divided yoke portions;

a plurality of second divided yoke portions arranged alternately with the first divided yoke portions in a circumferential direction, a gap between each of the plurality of first divided yoke portions and a respective adjacent second divided yoke portion of the plurality of second divided yoke portions;

a first tooth portion extending from one circumferential end of each first divided yoke portion, and a second tooth portion extending from the other circumferential end thereof; and a third tooth portion extending from one circumferential end, of each second divided yoke portion, which is on a second tooth portion side, and a fourth tooth portion extending from the other circumferential end thereof, wherein a first recess forming a corresponding one of the slot portions is formed so as to be surrounded by: a circumferential side surface, on a second tooth portion side, of the first tooth portion extending from each first divided yoke portion; a circumferential side surface, on a first tooth portion side, of the second tooth portion extending from the first divided yoke portion; and an inner circumferential surface of the first divided yoke portion, a second recess forming a corresponding one of the slot portions is formed so as to be surrounded by: a circumferential side surface, on a fourth tooth portion side, of the third tooth portion extending from each second divided yoke portion; a circumferential side surface, on a third tooth portion side, of the fourth tooth portion extending from the second divided yoke portion; and an inner circumferential surface of the second divided yoke portion, the first tooth portion, and the fourth tooth portion adjacent thereto are used for composing a corresponding one of the stacked tooth portions, the second tooth portion, and the third tooth portion adjacent thereto are used for composing a corresponding one of the stacked tooth portions, a tooth end portion of the first tooth portion and a tooth end portion of the fourth tooth portion adjacent thereto are integrally joined in a V shape at a first tooth end joint portion, and a tooth end portion of the second tooth portion and a tooth end portion of the third tooth portion adjacent thereto are integrally joined in a V shape at a second tooth end joint portion, whereby the iron core member is formed as one continuous sheet, and the inner rotor type stator for rotating electrical machine is formed with one or more sheets of the iron core members inserted into the coil, the iron core member having a ring shape such that the first tooth portions and the fourth tooth portions adjacent thereto are all configured to be compressible to be joined with each other, and the second tooth portions and the third tooth portions adjacent thereto are all configured to be compressible to be joined with each other to close the gaps between each of the plurality of first divided yoke portions and the respective adjacent second divided yoke portion.

14. The inner rotor type stator for rotating electrical machine according to claim 13, wherein
the iron core member has a hollow fan shape such that the first tooth portions and the fourth tooth portions adjacent thereto are joined with each other, and the second tooth portions and the third tooth portions adjacent thereto are joined with each other.

15. The inner rotor type stator for rotating electrical machine according to claim 13, wherein
the iron core member has a bellows shape as a whole such that the first divided yoke portions and the second divided yoke portions are arranged laterally in a row.

16. The inner rotor type stator for rotating electrical machine according to claim 13, wherein
widths of the tooth end portions of the first tooth portion and the second tooth portion in a circumferential direction of the iron core member are smaller than widths of the tooth end portions of the third tooth portion and the fourth tooth portion in the circumferential direction of the iron core member,
widths of base portions of the first tooth portion and the second tooth portion in the circumferential direction of the iron core member are smaller than widths of base portions of the third tooth portion and the fourth tooth portion in the circumferential direction of the iron core member,
the first tooth portion and the second tooth portion have shapes symmetric in the circumferential direction of the iron core member, and
the third tooth portion and the fourth tooth portion have shapes symmetric in the circumferential direction of the iron core member.

17. The inner rotor type stator for rotating electrical machine according to claim 13, wherein
a base portion of the first tooth portion and a base portion of the second tooth portion each have a cutout on at least one outer side surface in a circumferential direction of the iron core member, and
a base portion of the third tooth portion and a base portion of the fourth tooth portion each have a cutout on at least one outer side surface in the circumferential direction of the iron core member.

18. The inner rotor type stator for rotating electrical machine according to claim 13, wherein
the coil is attached across a plurality of the stacked tooth portions of the stacked iron core.

19. The inner rotor type stator for rotating electrical machine according to claim 13, wherein
a first branch portion where the first tooth portion and the fourth tooth portion branch from the first tooth end joint portion, and a second branch portion where the second tooth portion and the third tooth portion branch from the second tooth end joint portion, are smoothly formed.

20. The inner rotor type stator for rotating electrical machine according to claim 19, wherein
the first branch portion and the second branch portion are formed in a curved-surface shape.

21. The inner rotor type stator for rotating electrical machine according to claim 13, wherein
the first divided yoke portion and the second divided yoke portion have the same shape,
the first tooth portion and the third tooth portion have the same shape, and
the second tooth portion and the fourth tooth portion have the same shape.

22. The inner rotor type stator for rotating electrical machine according to claim 21, wherein
lengths of the first tooth end joint portion and the second tooth end joint portion in a radial direction of the iron core member are greater than widths of ends of the first tooth portion and the second tooth portion in a circumferential direction of the iron core member.

23. The inner rotor type stator for rotating electrical machine according to claim 21, wherein
a width of the tooth end portion of the first tooth portion in a circumferential direction of the iron core member is greater than a width of the tooth end portion of the second tooth portion in the circumferential direction of the iron core member, and
a width of a base portion of the first tooth portion in the circumferential direction of the iron core member is smaller than a width of a base portion of the second tooth portion in the circumferential direction of the iron core member.

24. The inner rotor type stator for rotating electrical machine according to claim 21, wherein
a width of the tooth end portion of the first tooth portion in a circumferential direction of the iron core member is greater than a width of the tooth end portion of the second tooth portion in the circumferential direction of the iron core member, and
a width of a base portion of the first tooth portion in the circumferential direction of the iron core member is greater than a width of a base portion of the second tooth portion in the circumferential direction of the iron core member.

25. The inner rotor type stator for rotating electrical machine according to claim 24, wherein
the tooth end portion of the second tooth portion has a cutout on an outer side surface thereof in the circumferential direction of the iron core member.

* * * * *